（12） United States Patent
Oroskar et al.

(10) Patent No.: US 9,706,521 B1
(45) Date of Patent: Jul. 11, 2017

(54) DESIGNATION OF PAGING OCCASIONS BASED UPON QUALITY OF SERVICE LEVEL

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 340 days.

(21) Appl. No.: 14/538,048

(22) Filed: Nov. 11, 2014

(51) Int. Cl.
*H04W 68/02* (2009.01)
*H04W 72/08* (2009.01)

(52) U.S. Cl.
CPC ......... *H04W 68/02* (2013.01); *H04W 72/085* (2013.01)

(58) Field of Classification Search
CPC ..................................................... H04W 68/02
See application file for complete search history.

(56) References Cited

U.S. PATENT DOCUMENTS

| 7,792,535 | B2 | 9/2010 | Benco et al. | |
| 2007/0060175 | A1 | 3/2007 | Park et al. | |
| 2009/0310503 | A1* | 12/2009 | Tenny | H04W 68/00 370/252 |
| 2011/0286465 | A1 | 11/2011 | Koodli et al. | |
| 2013/0064151 | A1* | 3/2013 | Mujtaba | H04B 7/0817 370/311 |
| 2013/0107778 | A1* | 5/2013 | Ryu | H04W 48/02 370/311 |
| 2013/0260811 | A1* | 10/2013 | Rayavarapu | H04W 76/028 455/509 |
| 2015/0124616 | A1* | 5/2015 | Lohman | H04W 28/08 370/235 |
| 2016/0112896 | A1* | 4/2016 | Karampatsis | H04W 28/0252 370/230.1 |

* cited by examiner

*Primary Examiner* — Brandon Renner
*Assistant Examiner* — Kevin Lee

(57) ABSTRACT

A base station may use the quality of service (QoS) levels of the bearer connections of user equipment devices (UEs) as a basis to allocate paging resources to the UEs. In one example, a UE may receive from the base station a message defining a plurality of recurring paging occasions. The plurality of paging occasions may include a first set of paging occasions and a second set of paging occasions that are mutually exclusive. The UE may then make a decision, based on a QoS level of a bearer connection of the UE, of whether to monitor one or more paging occasions of the first set of paging occasions or rather to monitor one or more paging occasions of the second set of paging occasions. And the UE may monitor, in accordance with the decision, at least one paging occasion for paging messages destined for the UE.

18 Claims, 6 Drawing Sheets

PAGING OCCASION DESIGNATIONS

PAGING OCCASION(S) FOR 1st SET
OF ONE OR MORE QOS LEVELS:    PO1, PO2

PAGING OCCASIONS(S) FOR 2nd SET
OF ONE OR MORE QOS LEVELS:    PO3, PO4

DESIGNATION OF PAGING OCCASIONS BASED UPON QUALITY OF SERVICE LEVEL

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wireless equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, the network infrastructure may include one or more packet data network gateways (PGWs) or similar components that provide connectivity with a packet-switched network so as to support general packet-data communications, such as general web browsing, file transfer, and the like, and/or packet-based real-time media communications such as voice over Internet Protocol (VoIP) and streaming media for instance.

A representative PGW may sit as a node on a wireless service provider's private packet-switched network and may thus provide connectivity with various application servers and other entities on that private network, and with other such entities accessible through a connection between the service provider's network and one or more other networks such as the public Internet. By way of example, such a PGW may provide connectivity with an Internet Multimedia Subsystem (IMS) platform or other session server that supports VoIP calling and/or other such media services.

When a UE first enters into the coverage of a cellular wireless network, the UE engages in a process of registering or "attaching" with the network, which may trigger setup of various communication channels for the UE and/or reservation of various communication resources for the UE. For instance, upon first detecting coverage of a base station, the UE may transmit an attach request message to the base station, which the base station may forward to a network controller such as a mobility management entity (MME). Upon authenticating and authorizing the UE, the network controller may then engage in further signaling with the base station and with a serving gateway (SGW), which may in turn engage in signaling with a PGW, ultimately resulting in setup of one or more bearer connections or "bearers" each extending, via the base station, between the UE and the PGW, through which the UE can then engage in packet-data communication via the PGW.

Each bearer established for a UE may define a logical communication tunnel that includes a radio bearer portion extending between the UE and the base station, and an access bearer portion extending between the base station and the PGW via the SGW. Further, each bearer may have a designated quality of service (QoS) level, which may dictate how the packet data transmission along the bearer is handled by the network. For instance, a bearer could have a relatively high QoS level, according to which network nodes (such as the base station, SGW, and various routers) along the bearer path could be set to prioritize routing of data on the bearer over routing of data on other bearers, perhaps to guarantee a particular minimum bit rate, a particular maximum level of packet delay, and/or a particular maximum level of data loss. Alternatively, a bearer could have a relatively low QoS level, such as a "best efforts" service level, according to which nodes along the bearer path would simply do their best to route data of the bearer, subject to higher priority handling of other bearer traffic.

In practice, a network such as this may initially establish for a UE one or more default bearers to enable the UE to engage in certain basic communications, with each default bearer having a respective QoS level. By way of example, the network may initially establish for the UE a default Internet bearer with a best-efforts QoS level, for use by the UE to engage in general Internet communication such as web browsing, e-mail messaging, and the like. Further, as the UE is served by the network, the network may establish for the UE additional bearers as needed. For instance, the network may establish for the UE a default IMS signaling bearer for use by the UE to engage in session setup signaling with the IMS to facilitate setup of packet-based real-time media sessions. And if the UE engages in signaling over the default IMS signaling bearer to setup a packet-based real-time media session, the network may establish for the UE a dedicated IMS bearer for carrying media content of the session.

Once the UE has completed the process of registering or attaching with the network, the UE may operate in an idle mode, meaning that the UE does not currently have assigned traffic channel resources on which to engage in UE-specific data communication. In the idle mode, the UE may periodically read a downlink control channel to receive overhead information from the network and to check for any paging messages destined to the UE. And when the network has packet data for transmission to the UE, the network may page the UE to then facilitate assigning traffic channel resources to the UE.

By way of example, in a Long-Term Evolution (LTE) system, a UE may operate in a discontinuous idle mode in which the UE operates with low power but periodically wakes up to check a downlink air interface control channel for a paging message. In particular, the LTE downlink defines frames of 10 milliseconds each divided into subframes of 1 millisecond each, and the UE may be configured to periodically check one or more "paging occasions" of the control channel in a particular frame and particular subframe(s) in search of a paging indicator. Upon finding such a paging indicator, the UE may then check a corresponding downlink shared channel space to see if there is a paging message for the UE. To transmit a paging message to the UE, a base station may thus set the paging indicator in a paging occasion that the UE is set to check and may include in the corresponding downlink shared channel space the paging message for the UE.

In practice, the UE would hash onto a particular paging occasion, based on an algorithm keyed to the UE's identifier and perhaps one or more other parameters specified in a system message. Further, the base station would apply the same hashing algorithm to determine the particular paging occasion in which the UE will expect any paging messages and the base station may transmit any paging message to the UE in that particular paging occasion.

For instance, in an LTE system, each paging frame may have a system frame number that ranges from 0 to 1023 and periodically repeats. In such a system, the UE may determine which paging frames to monitor using an algorithm keyed to the UE's International Mobile Subscriber Identity (IMSI), a unique number used to identify the UE. As an example, the algorithm may specify that, based on a UE's IMSI, the UE may be configured to check each paging frame where the system frame number is equal to 75, 203, 331, 459, 587, 715, 843, or 971. Note that this example amounts to checking a paging frame every 128 system frames (i.e., every 1.28 seconds). Furthermore, the UE may determine which subframe(s) of those paging frames to monitor using the algorithm. For instance, the algorithm may also indicate that the UE should monitor the tenth (i.e., last) subframe of each of those paging frames. Similarly, the base station may apply the same algorithm and determine that the base station should transmit any paging messages destined for the UE in the tenth subframe of the above-referenced paging frames. In this manner, the base station may transmit paging messages to the UE in paging occasions in which the UE is configured to monitor for paging messages.

OVERVIEW

In a coverage area of a wireless communication system, there may be a limited number of paging occasions in which the serving base station can transmit paging messages to served UEs. Further, each paging occasion may have a limited capacity for carrying paging messages. As an example, in LTE, there can be up to four paging occasions per paging frame, and each paging occasion may support up to 16 paging messages destined for 16 different UEs.

Given these limits, a base station that has too many paging messages to transmit during a particular paging occasion may need to shed or discard certain paging messages. By way of example, when experiencing paging congestion, the base station may have more paging messages to transmit during a particular paging occasion than the maximum number of paging messages per paging occasion. Consequently, the base station may need to select a subset of paging messages to transmit during the particular paging occasion, and shed the remainder of the paging messages. Generally, "shedding" a paging message may refer to discarding a paging message that is scheduled to be transmitted during a particular paging occasion. When a paging message is shed, the base station may instead transmit the paging message within a subsequent paging occasion or subsequent paging frame.

One approach to shedding paging messages is to prioritize paging to higher priority users. For example, when faced with limited resources in which to transmit paging messages, the base station may shed a paging message to a low priority user in favor of sending a paging message to a high priority user. According to another approach for shedding paging messages, the base station may delay transmission of paging messages to low priority users altogether when the base station is experiencing paging congestion.

Unfortunately, these approaches may create a scenario where many heavy or high priority users (e.g., users that communicate quite frequently) use an unfairly high percentage of paging occasion resources, leaving little paging occasion capacity for providing paging messages to light or low priority users. For example, if a base station provides priority to heavy users when allocating paging resources for a particular paging occasion, the base station may end up allocating more of the paging resources for the particular paging occasion to heavy users than to light users, or even allocating all of the paging resources for the particular paging occasion to heavy users. Furthermore, if low priority users are forced to repeatedly compete with high priority users for resources for each paging occasion of a paging frame, the base station may shed paging messages for the low priority users at multiple different times per paging frame.

Disclosed herein are methods and corresponding systems to help address these problems. In accordance with this disclosure, a base station may allocate paging resources based on whether UEs are heavy or light users. By way of example, a base station may use two mutually exclusive sets of paging occasions for carrying paging messages to UEs. Certain paging occasions may be designated for carrying paging messages to heavy users, and other paging occasions may be designated for carrying paging messages to light users. Accordingly, the base station may be arranged to make a decision, based on whether particular UEs are heavy users or light users, of which paging occasions to use for carrying paging message from the base station to the UEs.

Further, the base station may provide a message to the UEs defining the mutually exclusive sets of paging occasions. In this manner, the UEs may then make a decision, based on whether the UEs are heavy users or light users, of which paging occasions to monitor for paging messages.

In one implementation, each UE operating in coverage of a base station may have a respective bearer connection. Further, each UE's bearer connection may have a QoS level. In practice, the QoS level may be indicative of whether the UE is a heavy or light user. Therefore, the base station may use the QoS levels of the bearer connections as a basis to allocate paging resources to the UEs. And likewise, UEs may use the QoS levels of their respective bearer connections as a basis to decide which paging occasions to monitor for paging messages.

As a particular example, a UE that is configured to operate in coverage of a base station may have a bearer connection extending, via the base station, between the UE and a PGW. Further, the bearer connection may have a QoS level. The UE may receive from the base station a message defining a first set of paging occasions and a second set of paging occasions that are mutually exclusive from the first set of paging occasions. Further, in one instance, the message may specify that the first set of paging occasions are designated for carrying paging messages from the base station to UEs having bearer connections with QoS levels of a first set of one or more QoS levels and specify that the second set of paging occasions are designated for carrying paging messages from the base station to UEs having bearer connections with QoS levels of a second set of one or more QoS levels that are mutually exclusive from the first set of one or more QoS levels.

In this example, when deciding which paging occasion(s) to use for carrying paging messages to a particular UE, the base station may be arranged to make a decision, based on a QoS level of the particular UE's bearer connection, of whether to use one or more paging occasions of the first set of paging occasions for carrying paging messages from the base station to the particular UE or rather to use one or more paging occasions of the second set of paging occasions for carrying paging messages from the base station to the particular UE. For instance, the base station may determine that the QoS level of the particular UE's bearer connection is one of the first set of one or more QoS levels, and decide, based on the determination, to use one or more paging occasions of the first set of paging occasions to carry paging messages to the particular UE rather than using one or more paging occasions of the second set of paging occasions.

Further, continuing with the above example, each UE may then make a decision, based on the QoS level of the UE's bearer connection, of whether to monitor one or more paging occasions of the first set of paging occasions or rather to monitor one or more paging occasions of the second set of paging occasions. For instance, a particular UE may determine that the QoS level of the particular UE's bearer connection is one of the first set of one or more QoS levels, and decide, based on the determination, to monitor one or more paging occasions of the first set of paging occasions rather than monitoring one or more paging occasions of the second set of paging occasions. And after making the decision to monitor one or more paging occasions of the first set of paging occasions, the particular UE may periodically monitor one or more paging occasions of the first set of paging occasions for paging messages destined for the UE rather than monitoring one or more paging occasions of the second set of paging occasions.

Advantageously, with such a distribution of paging occasions based on QoS level, heavy users and light users may no longer be forced to compete against one another for paging occasion resources. Rather, in accordance with the disclosure, heavy users may compete against each other for paging resources of a first set of paging occasions, and light users may compete against each other for paging resources of a second set of paging occasions. Consequently, heavy or high priority users may no longer use an unfairly high percentage of paging occasion resources, and the base statin may not have to shed as many paging messages destined for light or low priority users.

Accordingly, disclosed herein is a method that may be implemented by a UE configured to operate in coverage of a base station. The UE may have a bearer connection extending, via the base station, between the UE and a PGW, and the bearer connection may have a QoS level. The method may involve the UE receiving from the base station a message defining a plurality of recurring paging occasions for carrying paging messages from the base station to UEs. The plurality of recurring paging occasions may include a first set of paging occasions and a second set of paging occasions, the first set of paging occasions and the second set of paging occasions being mutually exclusive. Further, the method may involve the UE making a decision, based on the QoS level of the bearer connection, of whether to monitor one or more paging occasions of the first set of paging occasions or rather to monitor one or more paging occasions of the second set of paging occasions. And the method may involve the UE monitoring, in accordance with the decision, at least one paging occasion for paging messages destined for the UE.

In another respect, disclosed is a UE that may be configured to operate in coverage of a base station. The UE may have a bearer connection extending, via the base station, between the UE and a PGW, and the bearer connection may have a QoS level. The UE may include an antenna structure and a controller. The antenna structure may be arranged to wirelessly receive paging messages from the base station. The base station may provide paging messages within a plurality of recurring paging occasions. The plurality of paging occasions may include a first set of paging occasions and a second set of paging occasions, the first set of paging occasions and the second set of paging occasions being mutually exclusive. Further, the controller may be arranged to: (i) use the QoS level of the bearer connection as a basis to decide whether to monitor one or more paging occasions of the first set of paging occasions or rather to monitor one or more paging occasions of the second set of paging occasions, and (ii) cause the UE to monitor, in accordance with the decision, at least one paging occasion for paging messages destined for the UE.

Still further, in another respect, disclosed is a base station that may include an antenna structure and a controller. The antenna structure may be arranged for wirelessly communicating with UEs, and the base station may use a plurality of recurring paging occasions for carrying paging messages from the base station to the UEs. The plurality of paging occasions may include a first set of paging occasions and a second set of paging occasions, the first set of paging occasions and the second set of paging occasions being mutually exclusive. Further, the controller may be arranged to make a decision, based on a QoS level of a bearer connection between a UE and a PGW, of whether to use one or more paging occasions of the first set of paging occasions for carrying paging messages from the first base station to the UE or rather to use one or more paging occasions of the second set of paging occasions for carrying paging messages from the base station to the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 2 is an illustration of an example message defining a plurality of paging occasions.

DETAILED DESCRIPTION

Figure 1:
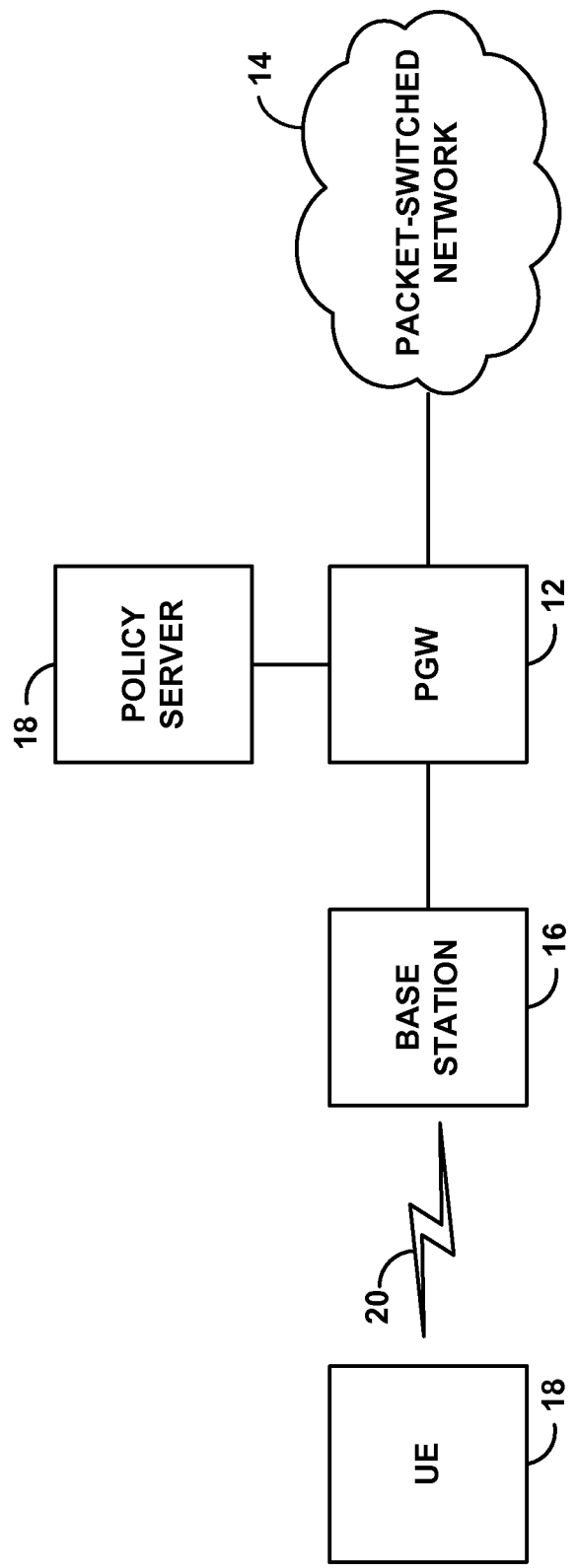
FIG. 1 is a simplified block diagram of an example network arrangement in which features of the present disclosure can be implemented.

Referring to the drawings, as noted above, FIG. 1 is a simplified block diagram of an example network arrangement in which the present disclosure can be implemented. As shown in FIG. 1, the example network arrangement includes a PGW 12 that provides connectivity with a packet-switched network 14. Further, the PGW is shown being in connection with a representative base station 16 and in connection with a policy server 18.

It should be understood that this and other arrangements described herein are set forth for purposes of example only and that numerous variations are possible. For instance, features can be added, removed, combined, distributed, or otherwise modified. By way of example, the solid lines shown connecting various elements could take various forms (e.g., wireless, wired, circuit-switched, packet-switched, direct, indirect, etc.), including various intervening entities such as routers, gateways, and the like. Further, various features described herein as being carried out by a network or by one or more particular entities can be carried out by one or more of the various disclosed components of the network, and particularly by any combination of hardware, firmware, and/or software, such as by one or more processing units executing program instructions.

In practice, base station 16 may take any of a variety of forms. By way of example, the base station may be a macro base station that is positioned at a fixed location and providing fairly wide coverage from that location. Alternatively, the base station may be a small cell base station that is currently located a particular location and may provide more restricted coverage from that location. Regardless, the base station may include a transceiver and an antenna structure that radiates to define at least one wireless coverage area in which to serve UEs, such as a representative UE 20 as shown.

As shown, UE 20 and base station 16 can communicate with each other over an air interface 22. In practice, the communication over the air interface may be in accordance with an agreed air interface protocol or radio access technology, examples of which include Orthogonal Frequency Division Multiple Access (OFDMA) (e.g., LTE or Wireless Interoperability for Microwave Access (WiMAX)), Code Division Multiple Access (CDMA), Global System for Mobile Communications (GSM), and others now know or later developed.

In this simplified arrangement, the UE may initially detect that it is within coverage of the base station and may responsively engage in an attach process with the base station. In line with the discussion above, for instance, the UE may transmit an attach request message over air interface 22 to base station 16, which may cause the network to authenticate the UE and to establish one or more bearers for the UE.

As discussed above, each bearer established for the UE may define a logical communication tunnel that includes a radio bearer portion extending between the UE and the base station, and an access bearer portion extending between the base station and the PGW. Further, each bearer established for the UE may have a designated QoS level, which may dictate how the packet data transmission is handled by the network.

In one example, the QoS level may include a quality of packet communication between the UE and the PGW (e.g., a minimum bit rate, a maximum level of packet delay, a maximum level of data loss, etc.). Alternatively or additionally, the QoS level may include a QoS class identifier (QCI) value defining the quality of packet communication. For instance, in an LTE implementation, QCI numbers may range from 1 to 9, with each QCI number corresponding to a particular type of service such as conversational voice, conversational video, real-time gaming, buffered video streaming, email, chat, etc.

In practice, the network may initially establish for the UE one or more default bearers to enable the UE to engage in certain basic communication, with each default bearer having a respective QoS level. For instance, the network may initially establish for the UE a default Internet bearer with a best-efforts QoS level. In one example, the policy server 18 may engage in signaling with the PGW to direct the PGW to invoke use of a bearer for the UE with an appropriate QoS level. By way of example, the policy server may store data deeming particular users to be heavy users or the like, perhaps based on analysis of usage records over time. Accordingly, when a default bearer is established for the UE, the PGW may query the policy server, requesting a QoS level for the default bearer, and in response to receiving the query, the policy server may determine an appropriate QoS level based on the stored data, and provide an indication of the QoS level to the PGW. Additionally, the base station may also provide an indication of the QoS level designated for the default bearer to the UE. Thus, the UE may learn of the QoS level during the attachment process.

In accordance with the present disclosure, in response to the policy server receiving a request for a QoS level for the default bearer for the UE, the policy server may select between a first QoS level (or first group of QoS levels) and a second QoS level (or second group of QoS levels) depending at least on whether or not the UE is a heavy user. For instance, if records stored by the policy server indicate that the UE is a heavy user, then the policy server may select a first QoS level and provide a response to the PGW that indicates the first QoS level. But if the records indicate that the UE is not a heavy user, the policy server may then instead select a second QoS level and provide a response to the PGW that indicates the second QoS level.

As a particular example, in an LTE implementation, the policy server 18 may have an interface with a policy and charging rules function (PCRF) (not shown). The PCRF may dynamically control and manage data sessions for UEs. For instance, the PCRF may authorize and enforce the maximum QoS level that is allowed for respective UEs, and may store data deeming particular users to be heavy users or the like. Accordingly, in response to the policy server receiving a request for a QoS level for the default bearer for the UE, the policy server may engage in signaling with the PCRF, and the PCRF may select an appropriate QCI level for the bearer depending on whether or not the UE is a heavy user. For instance, the PGW may provide an identifier of the UE to the PCRF, and the PCRF may make its selection of QCI for the bearer based at least in part on whether the stored data indicates that the UE is a heavy user or rather a light user. As an example, responsive to the UE being a heavy user, the PCRF may select for the bearer a first QCI level (e.g., QCI 8). On the other hand, responsive to the UE being a light user, the PCRF may select for the bearer a second QCI level (e.g., QCI 9).

Once the PCRF selects the QCI level for the bearer, the PCRF may engage in signaling to invoke use of that selected QCI level for the bearer. For instance, the PCRF may transmit to the PGW a Diameter message that directs the PGW to establish for the UE a bearer having the selected QCI level. In turn, the PGW, base station, and UE may engage in bearer-setup signally to establish for the UE a bearer with the selected QCI level.

Further in line with the discussion above, once the UE has completed the process of registering or attaching with the network, the UE may operate in an idle mode. In the idle mode, the UE may periodically read a downlink control channel to receive overhead information from the network and to check for any paging messages destined to the UE. And when the network has packet data for transmission to the UE, the network may page the UE to then facilitate assigning traffic channel resources to the UE.

In accordance with the present disclosure, as discussed above, the base station may allocate paging resources based on whether UEs are heavy or light users. For instance, the base station may use two mutually exclusive sets of paging occasions for carrying paging messages to UEs. As an example, the base station may be configured to use a first set of paging occasions for carrying paging messages to heavy users, and to use a second set of paging occasions for carrying paging messages to light users. Accordingly, with the example network arrangement of FIG. 1, the base station 16 may be arranged to make a decision, based on whether UE 20 is a heavy user or light user, of which set of paging occasions to use for carrying paging messages to the UE.

As discussed above, the QoS level of the UE's bearer connection may provide an indication of whether the UE is a heavy user or a light user. By way of example, the QoS level being one of a first set of one or more QoS levels may indicate that the UE is a heavy user, while the QoS level being one of a second set of one or more QoS levels may indicate that the UE is a light user. Therefore, when deciding which paging occasion(s) to use for carrying paging messages to the UE, the base station may make a decision, based on the QoS level of the UE's bearer connection, of whether to use one or more paging occasions of the first set of paging occasions or rather to use one or more paging occasions of the second set of paging occasions. For instance, the base station may determine that the QoS level of the UE's bearer connection is one of the first set of one or more QoS levels, and decide, based on the determination, to use one or more paging occasions of the first set of paging occasions to carry paging messages to the UE rather than using one or more paging occasions of the second set of paging occasions for carrying paging messages to the UE.

As a particular example, in an LTE implementation, the QoS level of the UE's bearer connection may be a QCI value. Furthermore, the QCI value being one of a first set of one or more QCI values may indicate that the UE is a heavy user, while the QCI value being one of a second set of one or more QCI values may indicate that the UE is a light user. With this arrangement, the base station may be configured to use one or more paging occasions of the first set of paging occasions for carry paging messages to the UE if the QCI value is one of the first set of one or more QCI values, but to use one or more paging occasions of the second set of paging occasions for carrying paging messages to the UE if the QCI value is one of the second set of one or more QCI values.

Further in line with the discussion above, the base station may be arranged to provide a system information message to UEs that are configured to operate in coverage of the base station, and the system information message may define the two mutually exclusive sets of paging occasions that the base station uses for carrying paging messages to the UEs. FIG. 2 is an illustration of an example message 30 that the base station may provide to UEs by way of example. In particular, the figure depicts a message that defines a first set of paging occasions and a second set of paging occasions. In practice, the example message 30 may be a portion of a system information message that the base station provides to UEs.

As shown in FIG. 2, the example message defines a first set of paging occasions corresponding to a first set of one or more QoS levels and a second set of paging occasions corresponding to a second set of one or more QoS levels. In particular, the message indicates that paging occasions PO1 and PO2 are designated for UEs having bearer connections with QoS levels of the first set of one or more QoS levels and indicates that paging occasions PO3 and PO4 are designated for UEs having bearer connections with QoS levels of the second set of one or more QoS levels.

In one implementation, each of the paging occasions PO1, PO2, PO3, and PO4 may correspond to respective subframes (e.g., LTE subframes). For instance, PO1 may correspond to a first subframe, PO2 may correspond to a fifth subframe, PO3 may correspond to a sixth subframe, and PO4 may correspond to a tenth subframe. Note that with this arrangement, the base station and the UEs may determine which paging frames the paging occasions PO1, PO2, PO3, and PO4 correspond to using an algorithm keyed to the UE's identity as discussed above. In other implementations, the paging occasions may correspond to other forms of paging resources (e.g., respective paging channels, paging time slots, etc.).

The example paging occasion designations of the message 30 are provided for purposes of example. In other arrangements, a paging occasion designation may include more or less information. For instance, in another arrangement, the message may indicate which QoS levels belong to the first set of one or more QoS levels and/or which QoS levels belong to the second set of one or more QoS levels. Similarly, the numbers of paging occasions within the first set of paging occasions and the second set of paging occasions are not meant to be limiting. In another arrangement, the first set of paging occasions and/or the second set of paging occasions may include a single occasion. Further, in some arrangements, the first set of paging occasions may include more or less paging occasions than the second set of paging occasions.

Additionally, in one embodiment, the example message may further specify a threshold level. For instance, the threshold level may be a QCI value or a quality of packet communication between the UE and the PGW (e.g., a minimum bit rate, a maximum level of packet delay, or a maximum level of data loss). In this embodiment, the base station may be configured to use one or more paging occasions of the first set of paging occasions for carrying paging messages to a UE if the QoS level of the UE's bearer connection satisfies a threshold condition, but to use one or more paging occasions of the second set of paging occasions for carrying paging messages to the UE if the QoS level of the UE's bearer connection does not satisfy the threshold condition. As one of ordinary skill in the art will appreciate, the threshold condition may involve the QoS level of the bearer connection being greater than the threshold level or the threshold condition may involve the QoS level of the bearer connection being less than the threshold level, depending on the desired implementation.

Further in line with the discussion above, upon receiving the message from the base station, the UEs operating in coverage of the base station may then make a decision, based on the QoS levels of their respective bearer connections, of which paging occasion(s) to monitor for paging messages. Specifically, the UEs may use the QoS levels of their respective bearer connections as a basis to decide whether to monitor one or more paging occasions of the first set of paging occasions or rather to monitor one or more paging occasions of the second set of paging occasions.

For instance, upon receiving the example message from base station 16, the UE 20 may determine that the QoS level of the UE's bearer connection is one of the QoS levels of the first set of one or more QoS levels, and decide, based on the determination, to monitor one or more paging occasions of the first set of paging occasions. Alternatively, if the UE determines that the QoS level of the UE's bearer connection is one of the QoS levels of the second set of one or more QoS levels, based on the determination, the UE may decide to monitor one or more paging occasions of the second set of paging occasions. And after making the decision regarding whether to monitor one or more paging occasions of the first set of paging occasions or rather one or more paging occasions of the second set of paging occasions, the UE may periodically monitor one or more paging occasions of either the first set of paging occasions or the second set of paging occasions in accordance with the decision.

As a particular example, in an LTE implementation, the UE may receive a message specifying that the first set of paging occasions are designated for carrying paging messages from the base station to UEs having bearer connections with QCI values of a first set of one or more QCI values and specifying that the second set of paging occasions are designated for carrying paging messages from the base station to UEs having bearer connections with QCI values of a second set of one or more QCI values. Further, the UE may have a bearer connection having a particular QCI value. In this scenario, if the UE determines that the particular QCI value is one of the QCI values of the first set of one or more QCI values, then, based on the determination that the particular QCI value is one of the QCI values of the first set of one or more QCI values, the UE may decide to monitor one or more paging occasions of the first set of paging occasions. But if the UE determines that the particular QCI value is one of the QCI values of the second set of one or more QCI values, then, based on the determination that the particular QCI value is one of the QCI values of the second set of one or more QCI values, the UE may decide to monitor one or more paging occasions of the second set of paging occasions.

In another example, the UE may be configured to monitor one or more paging occasions of the first set of paging occasions if the QoS level of the bearer connection satisfies a threshold condition, but to monitor one or more paging occasions of the second set of paging occasions if the QoS level of the bearer connection does not satisfy the threshold condition. For instance, the UE may be configured to monitor one or more paging occasions of the first set of paging occasions if the QoS level of the bearer connection is greater than a threshold level, but to monitor one or more paging occasion of the second set of paging occasions if the QoS level of the bearer connection is not greater than the threshold level. As discussed above, the threshold level may be a threshold QCI value, a threshold minimum bit rate, a threshold maximum level of packet delay, or a threshold maximum level of data loss, among other possibilities. Further, in some instances, the message that the UE receives from the base station may specify the threshold level.

Figure 3:
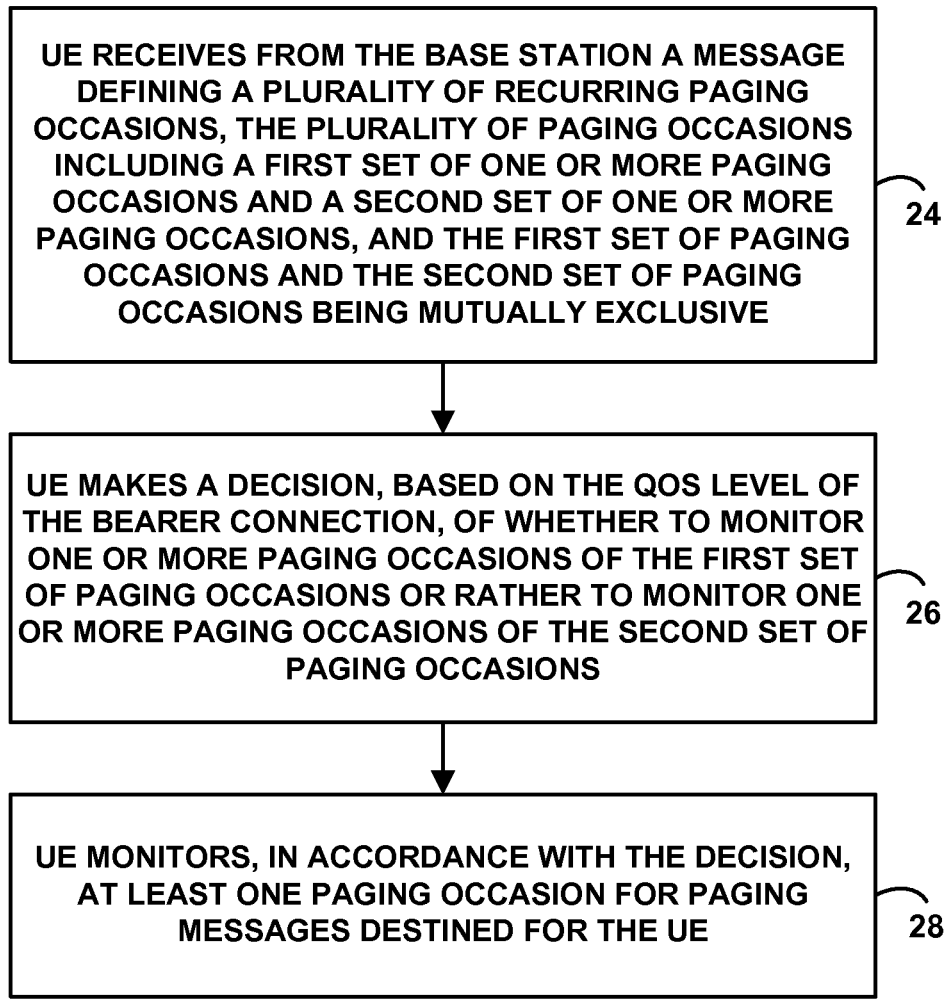
FIG. 3 is a flow chart depicting functions that can be carried out in accordance with the present disclosure.

FIG. 3 is next a flow chart depicting functions that can be carried out by a UE in accordance with the present disclosure. In line with the discussion above, the UE may be configured to operate in coverage of a base station, and the UE may have a bearer connection extending, via the base station, between the UE and a PGW. Further, the bearer connection may have a QoS level.

As shown in FIG. 3, at block 24, the UE receives from the base station a message defining a plurality of recurring paging occasions. The first plurality of paging occasions may include a first set of one or more paging occasions and a second set of one or more paging occasions, and the first set of paging occasions and the second set of paging occasions may be mutually exclusive. At block 26, the UE makes a decision, based on the QoS level of the bearer connection, of whether to monitor one or more paging occasions of the first set of paging occasions or rather to monitor one or more paging occasions of the second set of paging occasions. And at block 28, the UE monitors, in accordance with the decision, at least one paging occasion for paging messages destined for the UE.

By way of example, in line with the discussion above, the QoS level of the bearer connection may be a quality of packet communication between the UE and the PGW or the QoS level of the bearer connection may be a QCI value. And the base station may inform the UE of the QoS level of the bearer connection during the attachment process, for example.

Further, in line with the discussion above, in one implementation, the UE may be configured to monitor one or more paging occasions of the first set of paging occasions if the QoS level of the bearer connection satisfies a threshold condition, but to monitor one or more paging occasion of the second set of paging occasions if the QoS level of the bearer connection does not satisfy the threshold condition.

Figure 4:
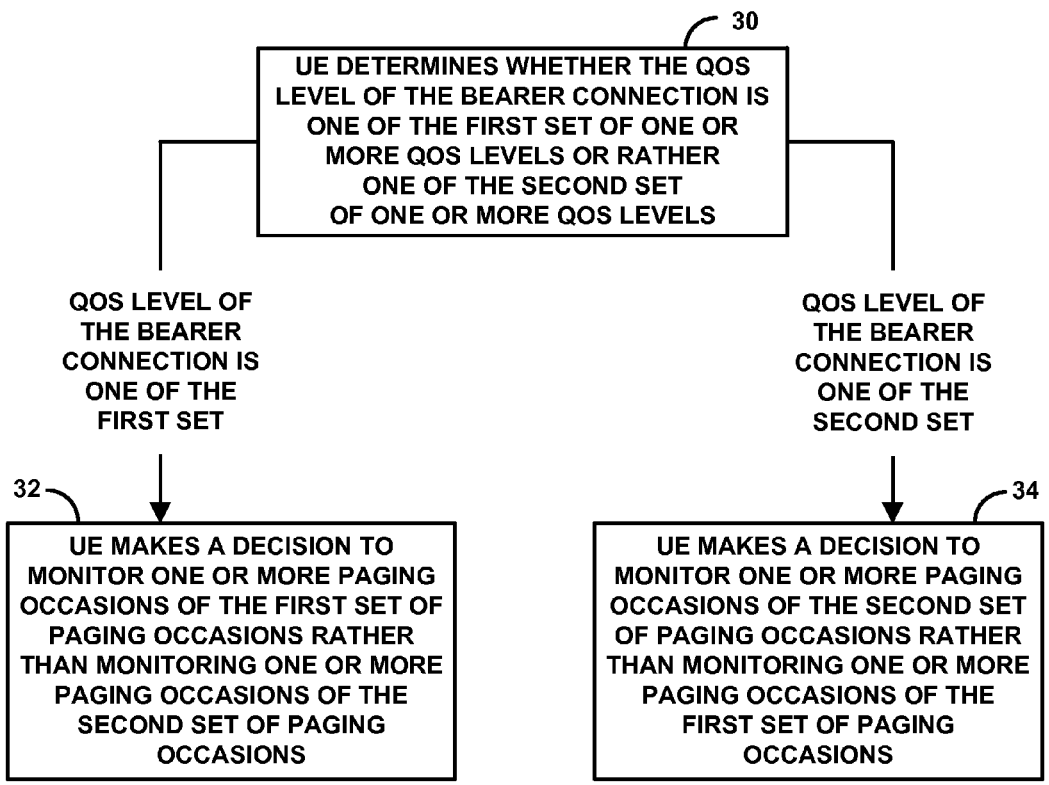
FIG. 4 is another flow chart depicting functions that can be carried out in accordance with the present disclosure.

Alternatively, as discussed above, in another implementation, the message may specify that the first set of paging occasions are designated for carrying paging messages from the base station to UEs having bearer connections with QoS levels of a first set of one or more QoS levels and specify that the second set of paging occasions are designated for carrying paging messages from the base station to UEs having bearer connections with QoS levels of a second set of one or more QoS levels, the first set of one more QoS levels and the second set of one more QoS levels being mutually exclusive. FIG. 4 is next a flow chart depicting functions that can be carried out by a UE in this implementation in accordance with the present disclosure.

As shown in FIG. 4, at block 30, the UE determines whether the QoS level of the bearer connection is one of the first set of one or more QoS levels or rather one of the second set of one or more QoS levels.

And at blocks 32 and 34, the UE then makes a decision of whether to monitor one or more paging occasions of the first set of paging occasions or rather to monitor one or more paging occasions of the second set of paging occasions based on the determination of whether the QoS level of the bearer connection is one of the first set of one or more QoS levels or rather one or more of the second set of one or more QoS levels. In particular, if the determination is that the QoS level of the bearer connection is one of the QoS levels of the first set of one or more QoS levels, then, at block 32, the UE makes a decision to monitor one or more paging occasions of the first set of paging occasions rather than monitoring one or more paging occasions of the second set of paging occasions. Whereas, if the determination is that the QoS level of the bearer connection is one of the QoS levels of the second set of one or more QoS levels, then, at block 34, the UE makes a decision to monitor one or more paging occasions of the second set of paging occasions rather than monitoring one or more paging occasions of the first set of paging occasions.

Further, if the decision is to monitor one or more paging occasions of the first set of paging occasions, then, based at least in part on the decision to monitor one or more paging occasions of the first set of paging occasions, the UE may monitor one or more paging occasions of the first set of paging occasions and not monitor any paging occasions of the second set of paging occasion. But if the decision is to monitor one or more paging occasions of the second set of paging occasions, then, based at least in part on the decision to monitor one or more paging occasions of the second set of paging occasions, the UE may monitor one or more paging occasions of the second set of paging occasions and not monitor any paging occasions of the first set of paging occasions.

Figure 5:
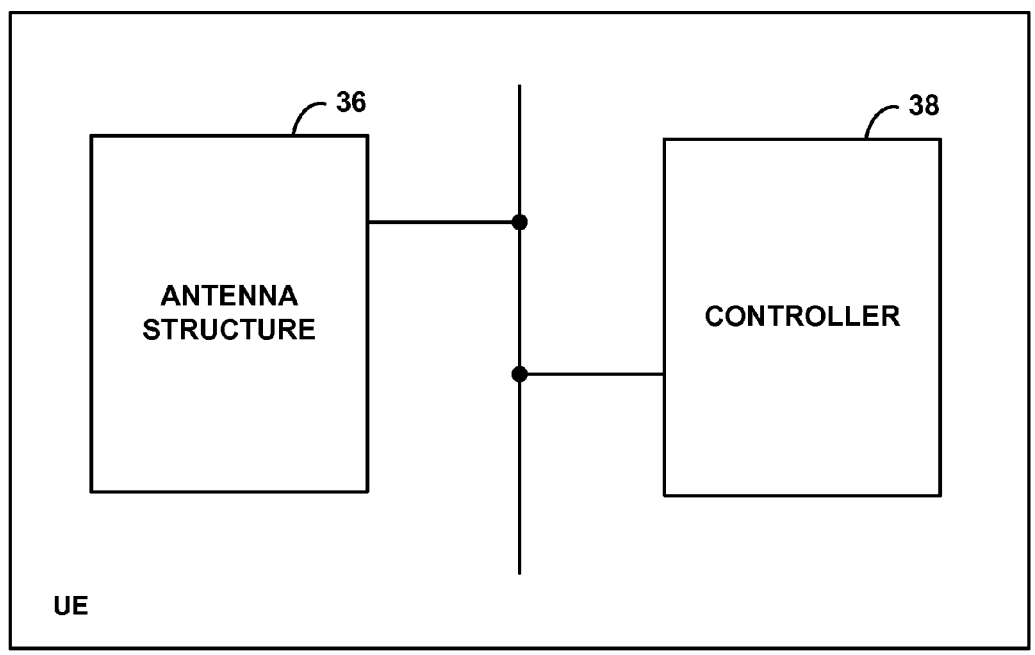
FIG. 5 is a simplified block diagram of an example UE, depicting components that can be included in such an entity to facilitate carrying out functions of the present disclosure.

Next, FIG. 5 is a simplified block diagram of an example UE, showing some of the components that such a UE may include to facilitate carrying out features of the present disclosure. In line with the discussion above, the UE may be configured to operate in coverage of a base station, and may have a bearer connection extending, via the base station, between the UE and a PGW. Further, the bearer connection may have a QoS level. Additionally, the base station may provide paging messages to UEs within a plurality of recurring paging occasions. In particular, the plurality of paging occasions may include a first set of paging occasions and a second set of paging occasions that are mutually exclusive from the first set of paging occasions.

As shown in FIG. 5, the example UE includes an antenna structure 36 and a controller 38. To facilitate carrying out features as discussed above, for instance, the antenna structure may be arranged to wirelessly receive paging messages from the base station. Further, the controller may be arranged to use the QoS level of the bearer connection as a basis to decide whether to monitor one or more paging occasions of the first set of paging occasions or rather to monitor one or more paging occasions of the second set of paging occasions. And still further, the controller may be arranged to cause the UE to monitor, in accordance with the decision, at least one paging occasion for paging messages destined for the UE.

In practice, the controller may comprise one or more processing units (such as one or more general purpose processors and/or application specific integrated circuits) programmed with instructions that the processor(s) may execute so as to carry out these features. Thus, when the UE receives an indication of the QoS level of the bearer connection from the base station, the processor(s) may use the QoS level as a basis to decide whether to monitor one or more paging occasions of the first set of paging occasions or rather to monitor one or more paging occasions of the second set of paging occasions. The processor(s) may then cause the UE to monitor, in accordance with the decision, at least one paging occasion for paging messages destined for the UE. As discussed above, in some instances, the antenna structure may be further arranged to receive from the base station a message that defines the first set of paging occasions and the second set of paging occasions, and the processor(s) may then read the message to determine the first set of paging occasions and the second set of paging occasions.

Figure 6:
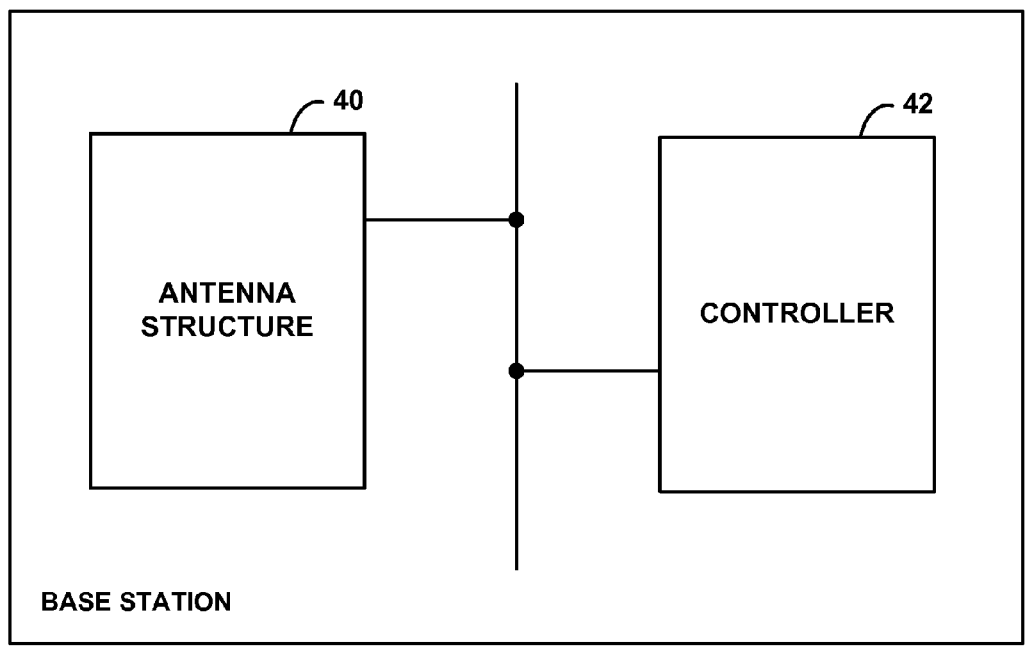
FIG. 6 is a simplified block diagram of an example base station, depicting components that can be included in such an entity to facilitate carrying out functions of the present disclosure.

Finally, FIG. 6 is a simplified block diagram of an example base station, showing some of the components that such a base station may include to facilitate carrying out features of the present disclosure. In line with the discussion above, the base station may be arranged to use a plurality of recurring paging occasions for carrying paging messages from the base station to the UEs. In particular, the plurality of paging occasions may include a first set of paging occasions and a second set of paging occasions that are mutually exclusive from the first set of paging occasions.

As shown in FIG. 6, the example base station includes an antenna structure 40 and a controller 42. To facilitate carrying out these features, for instance, the antenna structure may be arranged to wirelessly communicate with UEs. Further, in some instances, the antenna structure may be arranged to provide a system information to the UEs that defines the first set of paging occasions and the second set of paging occasions. And still further, the controller may be arranged to make a decision, based on a QoS level of a bearer connection between a UE and a PGW, of whether to use one or more paging occasions of the first set of paging occasions for carrying paging messages from the base station to the UE or rather to use one or more paging occasions of the second set of paging occasions for carrying paging messages from the base station to the UE.

In practice, the controller may comprise one or more processing units (such as one or more general purpose processors and/or application specific integrated circuits) programmed with instructions that the processor(s) may execute so as to carry out these features. Thus, when the base station receives a message (e.g., from a PGW, MME, policy server, or other network entity) indicating the QoS level of the UE's bearer connection, the processor(s) may read the message to determine the QoS level of the UE's bearer connection. The processor(s) may then make a decision, based on the determined QoS level, of whether to use one or more paging occasions of the first set of paging occasions or rather to use one or more paging occasions of the second set of paging occasions.

Although portions of this document focus on an LTE system by way of example, those of ordinary skill in the art will readily appreciate, however, that the disclosed principles can be applied as well in other types of wireless communication systems, with variations where appropriate. For instance, in a CDMA system, there could be multiple separately Walsh-coded paging channels and each may have a certain capacity of time slots for carrying paging messages. In such a system, a base station may likewise use two mutually exclusive sets of one or more paging channels for carrying paging messages to UEs (e.g., by having heavy-user paging use a different paging channel than light-user paging).

Exemplary embodiments have been described above. It should be understood, however, that variations from these embodiments are possible, while remaining within the scope of the invention.

We claim:

1. A method implemented by a user equipment device (UE) configured to operate in coverage of a base station, wherein the UE has a bearer connection extending, via the base station, between the UE and a packet data network gateway (PGW), and wherein the bearer connection has a quality of service (QoS) level, the method comprising:

the UE receiving from the base station a message defining a plurality of recurring paging occasions for carrying paging messages from the base station to UEs, wherein the plurality of recurring paging occasions includes a first set of paging occasions and a second set of paging occasions, the first set of paging occasions and the second set of paging occasions being mutually exclusive, and wherein the message specifies that the first set of paging occasions are designated for carrying paging messages from the base station to UEs having bearer connections with QoS levels of a first set of one or more QoS levels and specifies that the second set of paging occasions are designated for carrying paging messages from the base station to UEs having bearer connections with QoS levels of a second set of one or more QoS levels, the first set of one or more QoS levels and the second set of one or more QoS levels being mutually exclusive;

the UE making a decision, based on the QoS level of the bearer connection, of whether to monitor one or more paging occasions of the first set of paging occasions or rather to monitor one or more paging occasions of the second set of paging occasions, wherein the UE making the decision, based on the QoS level of the bearer connection, of whether to monitor one or more paging occasions of the first set of paging occasions or rather to monitor one or more paging occasions of the second set of paging occasions comprises: (i) determining that the QoS level of the bearer connection is one of the first set of one or more QoS levels, and (ii) deciding, based on the determination that the QoS level of the bearer connection is one of the first set of one or more QoS levels, to monitor one or more paging occasions of the first set of paging occasions rather than monitoring one or more paging occasions of the second set of paging occasions; and the UE monitoring, in accordance with the decision, at least one paging occasion for paging messages destined for the UE.

2. The method of claim 1, wherein the UE monitoring, in accordance with the decision, the at least one paging occasion for paging messages destined for the UE comprises:

if the decision is to monitor one or more paging occasions of the first set of paging occasions, then, based at least in part on the decision to monitor one or more paging occasions of the first set of paging occasions, the UE monitoring one or more paging occasions of the first set of paging occasions and not monitoring any paging occasions of the second set of paging occasions, but if the decision is to monitor one or more paging occasions of the second set of paging occasions, then, based at least in part on the decision to monitor one or more paging occasions of the second set of paging occasions, the UE monitoring one or more paging occasions of the second set of paging occasions and not monitoring any paging occasions of the first set of paging occasions.

3. The method of claim 1, wherein each QoS level of the first set of one or more QoS levels satisfies a threshold condition, and wherein each QoS level of the second set of one or more QoS levels does not satisfy the threshold condition, wherein the UE monitors one or more paging occasions of the first set of paging occasions if the QoS level of the bearer connection satisfies the threshold condition, but monitors one or more paging occasions of the second set of paging occasions if the QoS level of the bearer connection does not satisfy the threshold condition.

4. The method of claim 3:

wherein the threshold condition comprises the QoS level of the bearer connection being greater than a threshold level, and wherein, to specify that the first set of paging occasions are designated for carrying paging messages from the base station to UEs having bearer connections with QoS levels of the first set of one or more QoS levels and that the second set of paging occasions are designated for carrying paging messages from the base station to UEs having bearer connections with QoS levels of the second set of one or more QoS levels, the message specifies the threshold level.

5. The method of claim 1, wherein the QoS level of the bearer connection comprises a quality of packet communication between the UE and the PGW.

6. The method of claim 5, wherein the quality of packet communication between the UE and the PGW comprises a quality selected from the group consisting of: a minimum bit rate, a maximum level of packet delay, and a maximum level of data loss.

7. The method of claim 1, wherein the QoS level of the bearer connection comprises a QoS class identifier (QCI) value.

8. The method of claim 7:

wherein the message specifies that the first set of paging occasions are designated for carrying paging messages from the base station to UEs having bearer connections with QCI values of a first set of one or more QCI values and specifies that the second set of paging occasions are designated for carrying paging messages from the base station to UEs having bearer connections with QCI values of a second set of one or more QCI values, the first set of one or more QCI values and the second set of one or more QCI values being mutually exclusive, and wherein the UE making the decision, based on the QoS level of the bearer connection, of whether to monitor one or more paging occasions of the first set of paging occasions or rather to monitor one or more paging occasions of the second set of paging occasions comprises: (i) determining that a QCI value of the bearer connection is one of the first set of one or more QCI values, and (ii) deciding, based on the determination that the QCI value of the bearer connection is one of the first set of one or more QCI values, to monitor one or more paging occasions of the first set of paging occasions rather than monitoring one or more paging occasions of the second set of paging occasions.

9. The method of claim 1, wherein the message comprises a system information message.

10. The method of claim 1, wherein the first set of paging occasions comprises a first set of one or more subframes, and wherein the second set of paging occasions comprises a second set of one or more subframes, the first set of one or more subframes and the second set of one or more subframes being mutually exclusive.

11. The method of claim 1, further comprising the UE receiving from the base station an indication of the QoS level of the bearer connection.

12. A user equipment device (UE) configured to operate in coverage of a base station, wherein the UE has a bearer connection extending, via the base station, between the UE and a packet data network gateway (PGW), and wherein the bearer connection has a quality of service (QoS) level, the UE comprising:

an antenna structure arranged to wirelessly receive paging messages from the base station, wherein the base station provides paging messages within a plurality of recurring paging occasions, and wherein the plurality of recurring paging occasions includes a first set of paging occasions and a second set of paging occasions, the first set of paging occasions and the second set of paging occasions being mutually exclusive; and a controller arranged to: (i) use the QoS level of the bearer connection as a basis to decide whether to monitor one or more paging occasions of the first set of paging occasions or rather to monitor one or more paging occasions of the second set of paging occasions, and (ii) cause the UE to monitor, in accordance with the decision, at least one paging occasion for paging messages destined for the UE, wherein the UE receives via the antenna structure from the base station a message that specifies that the first set of paging occasions are designated for carrying paging messages from the base station to UEs having bearer connections with QoS levels of a first set of one or more QoS levels and specifies that the second set of paging occasions are designated for carrying paging messages from the base station to UEs having bearer connections with QoS levels of a second set of one or more QoS levels, the first set of one or more QoS levels and the second set of one or more QoS levels being mutually exclusive, and wherein the controller is arranged to cause the UE to monitor one or more paging occasions of the first set of paging occasions if the QoS level of the bearer connection is one of the first set of one or more QoS levels, but to cause the UE to monitor one or more paging occasions of the second set of paging occasions if the QoS level of the bearer connection is one of the second set of one or more QoS levels.

13. The UE of claim 12, wherein the QoS level of the bearer connection comprises a QoS class identifier (QCI) value.

14. The UE of claim 12, wherein the controller is arranged to cause the UE to monitor one or more paging occasions of the first set of paging occasions if the QoS level of the bearer connection satisfies a threshold condition, but to cause the UE to monitor one or more paging occasions of the second set of paging occasions if the QoS level of the bearer connection does not satisfy a threshold condition.

15. The UE of claim 14:
wherein the threshold condition comprises the QoS level of the bearer connection being greater than a threshold level; and
wherein the message specifies the threshold level.

16. A base station comprising:
an antenna structure for wirelessly communicating with user equipment devices (UEs), wherein the base station is arranged to use a plurality of recurring paging occasions for carrying paging messages from the base station to the UEs, and wherein the plurality of recurring paging occasions includes a first set of paging occasions and a second set of paging occasions, the first set of paging occasions and the second set of paging occasions being mutually exclusive; and
a controller,
wherein the base station is arranged to provide a system information message to UEs that defines the first set of paging occasions and the second set of paging occasions, wherein the message specifies that the first set of paging occasions are designated for carrying paging messages to UEs having bearer connections with quality of service (QoS) levels of a first set of one or more QoS levels and specifies that the second set of paging occasions are designated for carrying paging messages from the base station to UEs having bearer connections with QoS levels of a second set of one or more QoS levels, the first set of one or more QoS levels and the second set of one or more QoS levels being mutually exclusive, and wherein the controller is arranged to make a decision, based on a QoS level of a bearer connection between a UE and a packet data network gateway (PGW), of whether to use one or more paging occasions of the first set of paging occasions for carrying paging messages from the base station to the UE or rather to use one or more paging occasions of the second set of paging occasions for carrying paging messages from the base station to the UE.

17. The base station of claim 16, wherein the antenna structure is arranged to provide the system information message to the UEs.

18. The base station of claim 16, wherein the QoS level of the bearer connection comprises a QoS class identifier (QCI) value.

* * * * *